United States Patent
Achten et al.

(10) Patent No.: US 10,926,459 B2
(45) Date of Patent: Feb. 23, 2021

(54) POWDER-BASED ADDITIVE MANUFACTURING PROCESS AT LOW TEMPERATURES

(71) Applicant: Covestro Deutschland AG, Leverkusen (DE)

(72) Inventors: Dirk Achten, Leverkusen (DE); Thomas Büsgen, Leverkusen (DE); Dirk Dijkstra, Odenthal (DE); Nicolas Degiorgio, Krefeld (DE); Wolfgang Arndt, Dormagen (DE); Levent Akbas, Witten (DE); Roland Wagner, Leverkusen (DE); Peter Reichert, Dormagen (DE); Jörg Büchner, Bergisch Gladbach (DE)

(73) Assignee: Covestro Deutschland AG, Leverkusen (DE)

( * ) Notice: Subject to any disclaimer, the term of this patent is extended or adjusted under 35 U.S.C. 154(b) by 248 days.

(21) Appl. No.: 16/331,221

(22) PCT Filed: Sep. 11, 2017

(86) PCT No.: PCT/EP2017/072783
§ 371 (c)(1),
(2) Date: Mar. 7, 2019

(87) PCT Pub. No.: WO2018/046739
PCT Pub. Date: Mar. 15, 2018

(65) Prior Publication Data
US 2019/0184632 A1    Jun. 20, 2019

(30) Foreign Application Priority Data

Sep. 12, 2016  (EP) .................................. 16188417

(51) Int. Cl.
| | | |
|---|---|---|
| *B29C 64/153* | (2017.01) | |
| *B33Y 10/00* | (2015.01) | |
| *B29C 64/364* | (2017.01) | |
| *B33Y 80/00* | (2015.01) | |
| *B29C 64/188* | (2017.01) | |
| *B29C 64/165* | (2017.01) | |
| *B33Y 70/00* | (2020.01) | |
| *B29K 75/00* | (2006.01) | |

(52) U.S. Cl.
CPC .......... *B29C 64/153* (2017.08); *B29C 64/165* (2017.08); *B29C 64/188* (2017.08); *B29C 64/364* (2017.08); *B33Y 10/00* (2014.12); *B33Y 70/00* (2014.12); *B33Y 80/00* (2014.12); *B29K 2075/00* (2013.01); *B29K 2995/007* (2013.01); *B29K 2995/0012* (2013.01)

(58) Field of Classification Search
None
See application file for complete search history.

(56) References Cited

U.S. PATENT DOCUMENTS

| | | |
|---|---|---|
| 4,946,535 A | 8/1990 | Meckel et al. |
| 9,777,134 B2 | 10/2017 | Uenlue et al. |
| 2005/0080191 A1 | 4/2005 | Kramer et al. |
| 2006/0159896 A1 | 7/2006 | Pfeifer et al. |
| 2016/0096327 A1* | 4/2016 | Fry ........................ B29C 64/295 264/443 |
| 2016/0207147 A1* | 7/2016 | Van Hassel ............ B01D 47/00 |
| 2016/0207263 A1* | 7/2016 | Gordon .................. B33Y 30/00 |
| 2016/0214175 A1* | 7/2016 | Nordstrom ............ B29C 64/364 |
| 2017/0014906 A1* | 1/2017 | Ng ........................ B23K 26/703 |
| 2017/0129177 A1 | 5/2017 | Hättig et al. |

FOREIGN PATENT DOCUMENTS

| | | |
|---|---|---|
| DE | 102013113320 A1 | 6/2015 |
| EP | 0192946 A1 | 9/1986 |
| EP | 1648686 A1 | 4/2006 |
| WO | WO-03106146 A1 | 12/2003 |
| WO | WO-2005011959 A1 | 2/2005 |
| WO | WO-2015109143 A1 | 7/2015 |
| WO | WO-2015197515 A1 | 12/2015 |
| WO | WO-2016108154 A1 | 7/2016 |

OTHER PUBLICATIONS

International Search Report for PCT/EP2017/072783 dated Nov. 10, 2017.
Written Opinion of the International Searching Authority for PCT/EP2017/072783 dated Nov. 10, 2017.

* cited by examiner

*Primary Examiner* — Mary Lynn F Theisen
(74) *Attorney, Agent, or Firm* — Jed C. Benson

(57) ABSTRACT

A process for manufacturing an article comprises the steps of: applying a layer that consists of particles to a target area; allowing, in a chamber, energy to act on a selected portion of the layer, according to a cross-section of the article, so that the particles in the selected portion are bonded, and repeating the steps of applying and allowing energy to act for a plurality of layers so that the bonded portions of the adjacent layers are bonded to form the article, at least part of the particles comprising a fusible polymer. The fusible polymer has a fusion range (DSC, differential scanning calorimetry; 2nd heating at a heating rate of 5 K/min.) of $\geq 20°$ C. to $\leq 100°$ C. The fusible polymer further has a complex viscosity $|\eta^*|$ (determined by viscosity measurement in the melt using a plate-plate oscillating viscometer according to ISO 6721-10 at 100° C. and a shear rate of 1/s) of $\geq 10$ Pas to $\leq 1000000$ Pas. Finally, the temperature inside the chamber is $\leq 50°$ C. The invention also relates to an article manufactured by the process according to the invention, to an article having a substrate and to an article bonded to the substrate, the article being in the form of an adhesive joint or varnish region, and to the use of a particular polyurethane in powder-based additive manufacturing processes.

15 Claims, No Drawings

POWDER-BASED ADDITIVE MANUFACTURING PROCESS AT LOW TEMPERATURES

CROSS-REFERENCE TO RELATED APPLICATIONS

This application is a national stage application (under 35 U.S.C. § 371) of PCT/EP2017/072783, filed Sep. 11, 2017, which claims benefit of European Application No. 16188417.6, filed Sep. 12, 2016, both of which are incorporated herein by reference in their entirety.

The present invention relates to a method of producing an article, comprising the steps of: applying a layer of particles to a target surface; introducing energy into a selected portion of the layer corresponding to a cross section of the article in a chamber such that the particles in the selected portion are bonded and repeating the steps of applying and introducing energy for a multitude of layers, such that the bonded portions of the adjacent layers become bonded in order to form the article, where at least some of the particles include a fusible polymer. The invention likewise relates to an article produced by the method of the invention, to an article comprising a substrate and an article bonded to the substrate, where the article takes the form of an adhesive join or varnish region, and to the use of a particular polyurethane in powder-based additive manufacturing methods.

Additive manufacturing methods refer to those methods by which articles are built up layer by layer. They therefore differ distinctly from other methods of manufacturing articles such as machining, drilling or material removal. In the latter methods, an article is processed such that it takes on its final geometry via removal of material.

Additive manufacturing methods use different materials and processing techniques to build up articles layer by layer. In Fused Deposition Modeling (FDM), for example, a thermoplastic wire is liquefied and deposited onto a movable construction platform layer by layer with the aid of a nozzle. Solidification gives rise to a solid article. The nozzle and construction platform are controlled on the basis of a CAD drawing of the article. If the geometry of this article is complex, for example with geometric undercuts, support materials additionally have to be printed and removed again after completion of the article.

In addition, there exist additive manufacturing methods that use thermoplastic powders to build up articles layer by layer. In this case, by means of what is called a coater, thin layers of powder are applied and then selectively melted by means of an energy source. The surrounding powder here supports the component geometry. Complex geometries can thus be manufactured more economically than in the above-described FDM method. Moreover, different articles can be arranged or manufactured in a tightly packed manner in what is called the powder bed. Owing to these advantages, powder-based additive manufacturing methods are among the most economically viable additive manufacturing methods on the market. They are therefore used predominantly by industrial users. Examples of powder-based additive manufacturing methods are what are called selective laser sintering (SLS) or high-speed sintering (HSS). They differ from one another in the method for introducing energy for the selective melting into the plastic. In the laser sintering method, the energy is introduced via a deflected laser beam. In what is called the high-speed sintering (HSS) method (EP 1648686), the energy is introduced via infrared (IR) sources in combination with an IR absorber selectively printed into the powder bed. What is called selective heat sintering (SHS) utilizes the printing unit of a conventional thermal printer in order to selectively melt thermoplastic powders.

On the basis of the polymers that are nowadays used predominantly in powder-based additive manufacturing methods, articles are formed that have mechanical properties that can differ fundamentally from the characteristics of the materials as known in other plastics processing methods, such as injection molding. When processed by the additive manufacturing methods, the thermoplastic materials used lose their specific characteristics.

Nylon-12 (PA12) is the material currently most commonly used for powder-based additive manufacturing methods, for example laser sintering. PA12 is notable for high strength and toughness when it is processed by injection molding or by extrusion. A commercial PA12, for example, after injection molding has an elongation at break of more than 200%. PA12 articles that are produced by the laser sintering method, by contrast, show elongations at break around 15%. The component is brittle and therefore can no longer be regarded as a typical PA12 component. The same is true of polypropylene (PP), which is supplied in powder form for laser sintering. This material too becomes brittle and hence loses the tough, elastic properties that are typical of PP. The reasons for this are to be found in the morphology of the polymers.

During the melting operation by means of laser or IR and especially in the course of cooling, an irregular inner structure of the so-called semicrystalline polymers arises (for example PA12 and PP). The inner structure (morphology) of semicrystalline polymers is partly characterized by a high level of order. A certain proportion of the polymer chains forms crystalline, tightly packed structures in the course of cooling. During melting and cooling, these crystallites grow irregularly at the boundaries of the incompletely molten particles and at the former grain boundaries of the powder particles and on additives present in the powder. The irregularity of the morphology thus formed promotes the formation of cracks under mechanical stress. The residual porosity which is unavoidable in the powder-based additive method promotes the growth of cracks.

Brittle properties of the components thus formed are the result. For elucidation of this effect, reference is made to European Polymer Journal 48 (2012), pages 1611-1621. The elastic polymers based on block copolymers that are used in laser sintering also show a profile of properties untypical of the polymers used when they are processed as powder by additive manufacturing methods to give articles. Thermoplastic elastomers (TPE) are nowadays used in laser sintering. Articles that are produced from the TPEs now available have high residual porosity after solidification, and the original strength of the TPE material is not measurable in the article manufactured therefrom. In practice, these porous components are therefore subsequently infiltrated with liquid, hardening polymers in order to establish the profile of properties required. In spite of this additional measure, strength and elongation remain at a low level. The additional process complexity—as well as the still-inadequate mechanical properties—leads to poor economic viability of these materials.

In laser sintering methods using polymer particles, these are generally processed in a closed volume or chamber in order that the particles can be processed in a heated atmosphere. In this way it is possible to reduce the temperature differential that has to be overcome for sintering of the particles by action of the laser. In general, it can be stated that the thermal properties of the polymer affect the possible processing temperatures in laser sintering methods. Therefore, the prior art has proposed various solutions for such polymers and methods of processing them.

WO 03/106146 A1 discloses particles for use in selective laser sintering (SLS) comprising a core of at least one first material, an at least partial coating of the core with a second material, where the second material has a lower softening temperature than the first material. The softening temperature of the second material is less than about 70° C. This document further discloses a process for producing a three-dimensional article by means of SLS, having the steps of: applying a layer of particles to a target surface; irradiating a selected portion of the layer corresponding to a cross section of the article with a beam of energy such that the particles in the selected portion are bonded; repeating the steps of applying and irradiating for a multitude of layers, such that the bonded portions of the adjacent layers become bonded in order to form the article. Particles containing at least one material having a softening temperature of less than about 70° C. are used.

WO 2015/197515 A1 describes a thermoplastic pulverulent composition comprising 0.02% to 0.5% by weight, based on the total amount of composition, of plasticizer and pulverulent thermoplastic polyurethane, where at least 90% by weight of the composition has a particle diameter of less than 0.25 mm, where the thermoplastic polyurethane is obtainable from the reaction of components a) at least one organic diisocyanate, b) at least one compound having groups reactive toward isocyanate groups and having a number-average molecular weight ($M_n$) of 500 g/mol to 6000 g/mol and a number-average functionality of the totality of the components under b) of 1.8 to 2.5, c) at least one chain extender having a molecular weight ($M_n$) of 60-450 g/mol and a number-average functionality of the totality of the chain extenders under c) of 1.8 to 2.5, in the presence of d) optionally catalysts, e) optionally auxiliaries and/or additives, f) optionally one or more chain terminators.

The thermoplastic polyurethane according to WO 2015/197515 A1 has a melting range (DSC, differential scanning calorimetry; second heating operation at heating rate 5 K/min.) of 20 to 170° C. and a Shore A hardness to DIN ISO 7619-1 of 50 to 95, has a melt volume rate (MVR) at a temperature T to ISO 1133 of 5 to 15 cm$^3$10 min and a change in MVR in the case of an increase in this temperature T by 20° C. of less than 90 cm$^3$/10 min. The end use is the production of articles in powder-based additive manufacturing methods.

US 2005/0080191 A1 relates to a powder system for use in solid freeform fabrication methods, comprising at least one polymer having reactive properties and fusible properties, wherein the at least one polymer is selected in order to react with a liquid binder and is fusible at a temperature above the melting point or glass transition temperature of the at least one polymer. The at least one polymer may comprise at least one reactive polymer and at least one fusible polymer, and the at least one fusible polymer may have a melting point or glass transition temperature in the range from about 50° C. to about 250° C.

WO 2015/109143 A1 discloses systems and processes for the freeform fabrication of solids, especially laser sintering methods, and various articles obtained by the methods. The systems and processes use particular thermoplastic polyurethanes derived from (a) a polyisocyanate component (b) a polyol component and (c) an optional chain extension component, where the thermoplastic polyurethane polymer obtained has an enthalpy of fusion of at least 5.5 J/g, a crystallization temperature Tc of more than 70° C. and a Δ(Tm:Tc) of 20 degrees to 75 degrees, where Δ(Tm:Tc) is the difference between Tm (melting temperature) and Tc.

In practice, however, the heating of the chamber in laser sintering methods is associated with an unwanted temperature gradient from inner regions of the chamber to outer regions of the chamber and hence also with an unwanted temperature gradient within the powder bed. Particularly in the case of semicrystalline thermoplastic polymers, owing to different recrystallization kinetics, this circumstance can lead to variations in material properties within the finished component.

In the prior art, there still exists a need for powder-based additive manufacturing methods in which polymers having a low melting range can be used and in which the components obtained have homogeneous material properties.

What is proposed in accordance with the invention is a method of producing an article, comprising the steps of:
applying a layer of particles to a target surface;
introducing energy into a selected portion of the layer corresponding to a cross section of the article in a chamber such that the particles in the selected portion are bonded;
repeating the steps of applying and introducing energy for a multitude of layers, such that the bonded portions of the adjacent layers become bonded in order to form the article;
where at least some of the particles include a fusible polymer.

The fusible polymer has a melting range (DSC, differential scanning calorimetry, 2nd heating operation at heating rate 5 K/min.) of ≥20° C. to ≤100° C. The fusible polymer also has a magnitude of the complex viscosity |η*| (determined by viscometry measurement in the melt with a plate/plate oscillation viscometer according to ISO 6721-10 at 100° C. and a shear rate of 1/s) of ≥10 Pas to ≤1 000 000 Pas.

Finally, the temperature within the chamber is ≤50° C.

In the method of the invention, an article is built up layer by layer. If the number of repetitions for applying and irradiation is sufficiently low, it is also possible to make reference to a two-dimensional article which is to be constructed. Such a two-dimensional article can also be characterized as a coating. For example, for construction thereof, ≥2 to ≤20 repetitions for application and irradiation can be conducted.

It is envisaged that at least some of the particles include a fusible polymer. Preferably, all the particles used in the process include a fusible polymer. It is further preferable that at least 90% by weight of the particles have a particle diameter of ≤0.25 mm, preferably ≤0.2 mm, more preferably ≤0.15 mm. The particles comprising the fusible polymer may have, for example, a homogeneous construction such that no further fusible polymers are present in the particles. Preferably, the particle diameter is measured by means of static light scattering, as here with the Malvern Mastersizer 3000.

The energy source for bonding of the particles may be electromagnetic energy, for example UV to IR light. An electron beam is also conceivable. The bonding of the particles in the irradiated portion of the particle layer is typically effected through (partial) melting of a (semi-)crystalline material and bonding of the material in the course of cooling. Alternatively, it is possible that other transformations of the particles such as a glass transition, i.e. the heating of the material to a temperature above the glass transition temperature, bring about bonding of the particles to one another.

As well as the fusible polymer, the particles may also comprise further additives such as fillers, stabilizers and the like, but also further polymers. The total content of additives in the particles is preferably ≥0.1% by weight to ≤10% by weight, or preferably ≥1% by weight to ≤5% by weight.

The fusible polymer has a melting range of ≥20° C. to ≤100° C., preferably of ≥25° C. to ≤90° C. and more preferably of ≥30° C. to ≤80° C. In the DSC analysis for determination of the melting range, the material is subjected to the following temperature cycle: 1 minute at −60° C., then heating to 200° C. at 5 kelvin/minute, then cooling to −60° C. at 5 kelvin/minute, then 1 minute at −60° C., then heating to 200° C. at 5 kelvin/minute.

Particularly in respect of materials that are not in accordance with the invention, reference is also made hereinafter to a softening point. This softening point is the temperature within a melting range that is associated with the greatest change in viscosity. The softening point is consequently always within the melting range of a polymer.

It is possible that the temperature interval between the start of the melting operation and the end of the melting operation as determinable by the above DSC protocol is ≤20° C., preferably ≤10° C. and more preferably ≤5° C.

The fusible polymer also has a magnitude of the complex viscosity $|\eta^*|$ (determined by viscometry measurement in the melt with a plate/plate oscillation viscometer according to ISO 6721-10 at 100° C. and a shear rate of 1/s) of ≥10 Pas to ≤1 000 000 Pas. Preferably, $|\eta^*|$ under these measurement conditions is ≥100 Pas to ≤500 000 Pas, more preferably ≥1000 Pas to ≤200 000 Pas.

The magnitude of the complex viscosity $|\eta^*|$ describes the ratio of the viscoelastic moduli G' (storage modulus) and G" (loss modulus) to the excitation frequency ω in a dynamic-mechanical material analysis:

$$|\eta^*| = \sqrt{\left[\left(\frac{G'}{\omega}\right)^2 + \left(\frac{G''}{\omega}\right)^2\right]} = \frac{|G^*|}{\omega}$$

It is further envisaged in accordance with the invention that the temperature within the chamber is ≤50° C. The temperature is preferably ≥0° C. to ≤50° C., more preferably ≥10° C. to ≤40° C. and especially preferably ≥10° C. to ≤35° C.

It is further preferably envisaged that the temperature within the chamber is ≤50° C., or preferably ≤35° C., or preferably ≤20° C., or preferably ≤10° C., or preferably ≤−0° C., or preferably ≤−10° C., or preferably ≤−20° C., or preferably ≤−30° C., or preferably ≤−40° C., or preferably ≤−50° C. Preferably, the temperature within the chamber is within a range of ≥−80° C. to ≤50° C., or preferably of ≥−70° C. to ≤45° C., or preferably of ≥−60° C. to ≤40° C., or preferably of ≥−50° C. to ≤35° C., or preferably of ≥−40° C. to ≤30° C., or preferably of ≥−30° C. to ≤20° C. Further preferably, the temperature within the chamber is within a range of ≥0° C. to ≤50° C., or preferably of ≥5° C. to ≤40° C., or preferably of ≥10° C. to ≤35° C.

Preferably, the fusible polymer is in amorphous, crystalline or semicrystalline form when it is used in the method of the invention. Preferably, the melting temperature Tm of the fusible polymer or the glass transition temperature Tg of the amorphous polymer present in at least some of the particles which is used for the method of the invention for production of an article is within a range from 10 to 100° C., or preferably from 20 to 80° C., or preferably from 30 to 50° C., above the temperature within the chamber during the method of the invention.

The combination of the comparatively low melting range and the complex viscosity of the fusible polymer in conjunction with the comparatively low temperature of the chamber and hence of the fusible polymer particles that are irradiated with the beam of energy has multiple advantages. It is possible to reduce or to suppress component warping as a result of spatially different crystallization processes. By working at a temperature below 100° C., it is possible to avoid formation of blisters in the component through water vapor. It is thus possible for the polymer to contain greater amounts of water than at higher temperatures in the chamber.

A low melting range is especially understood to mean a low melting temperature of the polymer.

Given the complex viscosities within the range specified in accordance with the invention, it can be assumed that, at a chosen chamber temperature of ≤50° C., only a technically insignificant level of tackiness, if any, will occur in the fusible polymer used. Tackiness is especially understood to mean intrinsic tackiness.

It is likewise possible to reduce the degree of sublimation of organic compounds into the chamber. In that case, it is also possible to process polymers comprising plasticizer and solvent. No specially dried or inert atmosphere in the chamber is required. Explosion protection in the chamber is likewise improved when operation is effected at a temperature below the flashpoint of the substances present in the chamber.

Embodiments and further aspects of the invention are described hereinbelow. They may be combined with one another as desired unless the opposite is clear from the context.

In a preferred embodiment of the method of the invention, the introducing of energy into a selected portion of the layer corresponding to a cross section of the article such that the particles in the selected portion are bonded comprises the following step:

irradiating a selected portion of the layer corresponding to a cross section of the article with a beam of energy in the chamber such that the particles in the selected portion are bonded.

This form of the method can be regarded as a selective sintering method, especially as a selective laser sintering method (SLS). The beam of energy for bonding of the particles may be a beam of electromagnetic energy, for example a "light beam" of UV to IR light. Preferably, the beam of energy is a laser beam, more preferably having a wavelength between 600 nm and 15 μm. The laser may take the form of a semiconductor laser or of a gas laser. An electron beam is also conceivable. The bonding of the particles in the irradiated portion of the particle layer is typically effected through (partial) melting of a (semi-)crystalline material and bonding of the material in the course of cooling. Alternatively, it is possible that other transformations of the particles such as a glass transition, i.e. the heating of the material to a temperature above the glass transition temperature, bring about bonding of the particles to one another.

Preferably, the introduction of energy into a selected portion of the layer in the method of the invention takes place by irradiation with at least one laser, preferably 1 to 5 lasers, preferably a diode laser or a $CO_2$ laser, with a watt output of preferably 1 W to 200 W, or preferably of 5 W to 250 W, or preferably of 10 W to 120 W, per laser. Preferably, the laser has a diameter of the laser beam ("laser spot") of 0.01 mm to 5 mm, or preferably of 0.05 mm to 1 mm, or preferably of 0.1 mm to 0.5 mm. Preferably, the scan rate used is within a range from 1 to 50 m/s, or preferably from 2 to 30 m/s, or preferably from 5 to 20 m/s. Preferably, the irradiation distance of the scanning laser lines ("hatch distance") is within a range from 0.01 mm to 5 mm, or preferably from 0.05 mm to 1 mm, or preferably from 0.1 mm to 0.5 mm. Preferably; the construction rate is within a range from 1 to 10 000 ml/h, or preferably 5 to 6000 ml/h, or preferably from 10 to 5000 ml/h, or preferably 15 to 4000 ml/h. Typical energy inputs are within a range from 0.005 to 0.5 J/mm$^2$, or preferably from 0.007 to 0.2 J/mm$^2$, or preferably from 0.01 to 0.1 J/mm$^2$.

In a further preferred embodiment of the method of the invention, the introducing of energy into a selected portion of the layer corresponding to a cross section of the article such that the particles in the selected portion are bonded comprises the following steps:

applying a liquid to a selected portion of the layer corresponding to a cross section of the article, where said liquid increases the absorption of energy in the regions of the layer with which it comes into contact relative to the regions with which it does not come into contact;

irradiating the layer in the chamber such that the particles in regions of the layer that come into contact with the liquid are bonded to one another and the particles in regions of the layer that do not come into contact with the liquid are not bonded to one another.

In this embodiment, for example, a liquid comprising an IR absorber can be applied to the layer by means of inkjet methods. The irradiation of the layer leads to selective heating of those particles that are in contact with the liquid including the IR absorber. In this way, bonding of the particles can be achieved.

The energy source for selective bonding of the particles is especially a UV to IR source. The bonding of the particles in the irradiated portion of the particle layer is typically effected through (partial) melting of a (semi-)crystalline material and bonding of the material in the course of cooling. Alternatively, it is possible that other transformations of the particles such as a glass transition, i.e. the heating of the material to a temperature above the glass transition temperature, bring about bonding of the particles to one another.

In a further preferred embodiment of the method of the invention, the interior of the chamber is cooled at least at times. Suitable cooling methods include the cooling of one or more walls of the chamber or the providing of cold, inert gas within the chamber. It is alternatively possible that the interior of the chamber is not heated at least at times. In that case, the thermal energy introduced by the action of energy is exploited to maintain the desired temperature in the chamber.

In a further preferred embodiment of the method of the invention, the fusible polymer has a Shore hardness (DIN ISO 7619-1) of ≥40A to ≤80D. Preference is given to Shore hardnesses of ≥40A to ≤70D, more preferably ≥50A to ≤50D.

In a further preferred embodiment of the method of the invention, the fusible polymer is selected from the group consisting of: polyurethane, polyester, polyalkylene oxide, plasticized PVC, polyamide, protein or a combination of at least two of these.

Preferably, the fusible polymer is a polyurethane at least partly obtainable from the reaction of aromatic and/or aliphatic polyisocyanates with suitable (poly)alcohols and/or (poly)amines or blends thereof. Preferably; at least a proportion of the (poly)alcohols used comprises those from the group consisting of: linear polyesterpolyols, polyetherpolyols, polycarbonatepolyols, polyacrylatepolyols or a combination of at least two of these. In a preferred embodiment, these (poly)alcohols or (poly)amines bear terminal alcohol and/or amine functionalities. In a further preferred embodiment, the (poly)alcohols and/or (poly)amines have a molecular weight of 52 to 10 000 g/mol. Preferably, these (poly)alcohols or (poly)amines as feedstocks have a melting point in the range from 5 to 150° C. Preferred polyisocyanates that can be used at least in a proportion for preparation of the fusible polyurethanes are TDI, MDI, HDI, PDI, H12MDI, IPDI, TODI, XDI, NDI and decane diisocyanate. Particularly preferred polyisocyanates are HDI, PDI, H12MDI, MDI and TDI.

In a further preferred embodiment, the fusible polymer is a polyurethane obtainable from the reaction of a polyisocyanate component and a polyol component, said polyol component comprising a polyesterpolyol having a no-flow point (ASTM D5985) of ≥25° C.

If appropriate, in the reaction to give the polyurethane, it is also possible to use diols from the molecular weight range of ≥62 to ≤600 g/mol as chain extenders.

The polyisocyanate component may comprise a symmetric polyisocyanate and/or a nonsymmetric polyisocyanate. Examples of symmetric polyisocyanates are 4,4'-MDI and HDI.

In the case of nonsymmetric polyisocyanates, the steric environment of one NCO group in the molecule is different from the steric environment of a further NCO group. In that case, one isocyanate group reacts more quickly with groups reactive toward isocyanates, for example OH groups, while the remaining isocyanate group is less reactive. One consequence of the nonsymmetric structure of the polyisocyanate is that the polyurethanes formed with these polyisocyanates also have a less linear structure.

Examples of suitable nonsymmetric polyisocyanates are selected from the group consisting of: 2,2,4-trimethylhexatnethylene diisocyanate, ethylethylene diisocyanate, nonsymmetric isomers of dicyclohexylmethane diisocyanate (H$_{12}$-MDI) nonsymmetric isomers of 1,4-diisocyanatocyclohexane, nonsymmetric isomers of 1,3-diisocyanatocyclohexane, nonsymmetric isomers of 1,2-diisocyanatocyclohexane, nonsymmetric isomers of 1,3-diisocyanatocyclopentane, nonsymmetric isomers of 1,2-diisocyanatocyclopentane, nonsymmetric isomers of 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanate-2,4,4-trimethylhexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanate-2-(3-isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclohexane, norbornane diisocyanatomethyl, diphenylmethane 2,4'-diisocyanate (MDI), tolylene 2,4- and 2,6-diisocyanate (TDI), derivatives of the diisocyanates listed, especially dimerized or trimerized types, or a combination of at least two of these.

Preference is given to 4,4'-MDI or a mixture comprising IPDI and HDI as polyisocyanate component.

The polyol component includes a polyester polyol having a no-flow point (ASTM D5985) of 25° C., preferably ≥35° C., more preferably ≥35° C. to ≤55° C. To determine the no-flow point, a test vessel containing the sample is set in slow rotation (0.1 rpm). A flexibly mounted measurement head dips into the sample and, on attainment of the no-flow point, moves away from its position as a result of the abrupt increase in viscosity; the resulting tilting motion triggers a sensor.

Without being restricted to a theory, it is assumed that polyurethanes based on the above-discussed nonsymmetric polyisocyanates and polyesterpolyols having the no-flow points specified have such a construction that the groups that originate from the polyisocyanates in the polymer constitute soft segments, and the groups that originate from the polyester polyols in the polymer constitute hard segments.

At the temperatures in the chamber of the processing system that are envisaged in accordance with the invention, it is assumed that the mobility of the polyester chains in the polyurethane is as limited as would be the case in the free polyesterpolyol below its no-flow point. Correspondingly, the polyurethane polymer has only a technically insignificant level of tackiness, if any, under the processing conditions (preferably after a time of ≥1 minute to ≤2 hours).

Examples of polyesterpolyols which can have such a no-flow point are reaction products of phthalic acid, phthalic anhydride or symmetric $\alpha,\omega$-$C_4$- to $C_{10}$-dicarboxylic acids with one or more $C_2$- to $C_{10}$-diols. They preferably have a number-average molecular weight $M_n$ of ≥400 g/mol to ≤6000 g/mol. Suitable diols are especially monoethylene glycol, butane-1,4-diol, hexane-1,6-diol and neopentyl glycol.

Preferred polyesterpolyols are specified hereinafter, stating their acid and diol components: adipic acid+monoethylene glycol; adipic acid+monoethylene glycol+butane-1,4-diol; adipic acid+butane-1,4-diol; adipic acid+hexane-1,6-diol neopentyl glycol; adipic acid+hexane-1,6-diol; adipic acid+butane-1,4-diol+hexane-1,6-diol; phthalic acid/anhydride+monoethylene glycol+trimethylolpropane; phthalic acid/anhydride+monoethylene glycol. Preferred polyurethanes are obtained from a mixture comprising IPDI and HDI as polyisocyanate component and a polyol component comprising an aforementioned preferred polyesterpolyol. Particular preference is given to the combination of a mixture comprising IPDI and HDI as polyisocyanate component with a polyesterpolyol formed from adipic acid+butane-1,4-diol+hexane-1,6-diol for formation of the polyurethanes.

It is further preferable that the polyesterpolyols have an OH number (DIN 53240) of ≥25 to ≤170 mg KOH/g and/or a viscosity (75° C., DIN 51550) of ≥50 to ≤5000 mPas.

One example is a polyurethane obtainable from the reaction of a polyisocyanate component and a polyol component, where the polyisocyanate component comprises an HDI and IPDI and where the polyol component comprises a polyesterpolyol which is obtainable from the reaction of a reaction mixture comprising adipic acid and also hexane-1,6-diol and butane-1,4-diol with a molar ratio of these diols of ≥1:4 to ≤4:1 and which has a number-average molecular weight $M_n$ (GPC, against polystyrene standards) of ≥14000 g/mol to ≤6000 g/mol. Such a polyurethane may have a magnitude of the complex viscosity $|\eta^*|$ (determined by viscometry measurement in the melt with a plate/plate oscillation viscometer according to ISO 6721-10 at 100° C. and a shear rate of 1/s) of ≥4000 Pas to ≤160 000 Pas.

A further example of a suitable polyurethane is:

1. Substantially linear polyester polyurethanes having terminal hydroxyl groups as described in EP 0192946 A1, prepared by reaction of a) polyester diols of molecular weight above 600 and optionally
b) diols from the molecular weight range from 62 to 600 g/mol as chain extenders with
c) aliphatic diisocyanates, observing an equivalents ratio of hydroxyl groups of components a) and b) to isocyanate groups of component c) of 1:0.9 to 1:0.999, where component a) consists to an extent of at least 80% by weight of polyester diols from the molecular weight range of 4000 to 6000 based on (i) adipic acid and (ii) mixtures of 1,4-dihydroxybutane and 1,6-dihydroxyhexane in a molar ratio of the diols of 4:1 to 1:4.

In the polyester polyurethanes mentioned under 1., it is preferable that component a) consists to an extent of 100% of a polyester diol of the molecular weight range from 4000 to 6000, the preparation of which involved using, as diol mixture, a mixture of 1,4-dihydroxybutane and 1,6-dihydroxyhexane in a molar ratio of 7:3 to 1:2.

In the polyester polyurethanes mentioned under 1., it is also preferable that component c) comprises IPDI and also HDI.

In the polyester polyurethanes mentioned under 1., it is also preferable that the preparation thereof involved also using, as component b), alkanediols selected from the group consisting of: 1,2-di hydroxyethane, 1,3-dihydroxypropane, 1,4-dihydroxybutane, 1,5-dihydroxypentane, 1,6-dihydroxyhexane or a combination of at least two of these, in an amount of up to 200 hydroxyl equivalent percent, based on component a).

In a further preferred embodiment of the method of the invention, the fusible polymer, after heating to 100° C. and cooling to 20° C. at a cooling rate of 4° C./min, within a temperature interval from 25° C. to 40° C. for ≥1 minute (preferably ≥1 minute to ≤100 minutes, more preferably ≥10 minutes to ≤60 minutes), has a storage modulus G' (determined at the respective temperature with a plate/plate oscillation viscometer according to ISO 6721-10 at a shear rate of 1/s) of ≥100 kPa to ≤1 MPa and, after cooling to 20° C. and storage at 20° C. for 120 minutes, has a storage modulus G' (determined at 20° C. with a plate/plate oscillation viscometer according to ISO 6721-10 at a shear rate of 1/s) of ≥10 MPa (preferably ≥100 MPa).

In a further preferred embodiment of the method of the invention, at least some of the particles include the fusible polymer and a further polymer and/or inorganic particles. In that case, what are called co-powders are used. The further polymer may form one or more phases with the fusible polymer. It may be entirely or partly melted by introduction of the beam of energy in the chamber or else remain in the solid state. Examples of inorganic particles are fillers such as silica, limestone flour, natural ground chalks (calcium carbonates or calcium magnesium carbonates), barytes, talc, mica, clays or, if appropriate, also carbon black. The total proportion of the further polymer and/or the inorganic particles may, for example, be ≥5% by weight to ≤50% by weight, based on the total weight of the particles.

In a further preferred embodiment of the method of the invention, the article formed is subjected to an aftertreatment selected from the group consisting of: mechanical smoothing of the surface, controlled local heating, heating of the entire article, controlled local cooling, cooling of the entire article, contacting of the article with steam, contacting of the article with the vapor of an organic solvent, irradiating the article with electromagnetic radiation, immersing the article into a liquid bath, or a combination of at least two of these. Aftertreatments of this kind serve particularly to improve the surface quality of the article.

In a further preferred embodiment of the method of the invention, the particles, after the step of applying a layer of particles to the target surface, are at least partly suspended in a liquid phase. The liquid phase can be removed at a later stage in the method. After the application of a particle layer, it is thus possible to selectively provide a region of the particle layer with an ink which, in combination with the beam of energy, leads to bonding of the particles to one another. In this way, elements of the high-speed sintering (HSS) method are adopted.

In a further preferred embodiment of the method of the invention, the article is formed on a substrate and, on conclusion of the method, remains bonded to the substrate. Thus, the target surface in the first step of the first operation in the method of the invention is the substrate. The substrate is preferably a component intended for bonding to other components. It is further preferable that a polyurethane polymer is used as material for the article. Owing to its properties, the polymer may be utilizable as adhesive and/or as varnish. By the method of the invention, it is thus possible to apply an adhesive layer, an adhesive join, a varnish layer or a coating selectively to a workpiece. The adhesive layer or adhesive join that has been applied by a method of the invention may also differ chemically and visually from sintered adhesive layers. Adhesive layers obtained by application sintering have a lower density and generally a matter surface. The varnish layer or coating that has been applied by a method of the invention may also differ chemically and visually from baked powder coating layers. Varnish layers obtained by application sintering are applied more accurately in terms of position and generally have a matter surface.

The invention further relates to an article that has been produced by a method of the invention. In a preferred embodiment, the article takes the form of a shaped adhesive body. The shape of the shaped adhesive body can be chosen with an exact fit for components to be bonded. Such a shaped body may be nontacky at room temperature and may be produced to be held in stock. It can be positioned at its intended site by appropriate manipulation tools and be activated by heat, and in this way can bond components to be bonded to one another.

The invention further provides an article produced by a method of the invention, having the features that the article is formed on a substrate and, on conclusion of the method, remains bonded to the substrate, having a substrate and an article bonded to the substrate, wherein the article takes the form of an adhesive join or of a varnish region.

The particles that were used in the experiments which follow were produced by mechanical grinding of the starting materials in the form of granules, pellets, precomminuted coarse material or the like with a maximum diameter of 4 to 6 mm, which were in the form of coarse powder or pellets, at temperatures below 0° C. As an alternative to grinding, suitable powders were produced at temperatures below 0° C., preferably below −20° C., or preferably below −60° C., for example by grinding, abrading, fragmenting or crushing. Likewise conceivable is the precipitation of particles from homogeneous solutions by the exceedance of a critical concentration (coagulation) or with the aid of one or more precipitants/cosolvents. It is also possible to produce corresponding powders by microgranulation or by spray drying/solidification (for example from melts or from solutions).

The Desmomelt® particles used were obtained by cryogenic grinding of Desmomelt® VPKA8702 pellets, commercially available from Covestro Deutschland AG, in a pinned disk mill (rotor/stator, for example a GSM 250 pinned disk mill from ACU-Pharma) with liquid nitrogen as cooling agent. For this purpose, Desmomelt® VPKA8702 pellets were precooled with liquid nitrogen and introduced into the grinder with further liquid nitrogen in order to keep the temperature at least lower than −80° C. over the entire grinding operation. The particles were subsequently screened with various screen sizes of 500 µm, through 250 µm, down to 125 µm. The remaining particles >125 µm were introduced back into the grinding operation, as described above, to give new pellets. The particles screened below 125 µm were thawed and brought to room temperature.

The Dispercoll® particles, based on commercially available Dispercoll U XP 2682 from Covestro Deutschland AG, were precipitated out of a stable aqueous dispersion by freezing at −20° C., filtered and, prior to the cryogenic grinding, dried in a Binder FDL115 drying cabinet at 30° C. for 48 hours. For this purpose, the powder was spread out on a metal sheet. The same procedure for grinding as described above for the provision of the Desmomelt® particles was employed.

The comparative material used was polyamide particles with the Polyamide FS 3300 PA brand name, sold by Hunan Farsoon High-tech Co., Ltd., without further pretreatment.

For production of articles by fusion of polymer particles of materials suitable in accordance with the invention, for example Dispercoll® UXP2682 from Covestro Deutschland AG, Desmomelt® VFKA8702 from Covestro Deutschland AG, or of materials for comparative experiments, for example Polyamide FS 3300 PA from Hunan Farsoon High-tech Co., Ltd., 12 g of the respective polymer in particle form were introduced into an aluminum trough having a diameter of 60 mm and a depth of 8 mm and smoothed out. The samples thus produced were stored at different temperatures for 20 hours, and so it was ensured that the overall powder had the desired temperature prior to the sintering process. For each material, a sample was preequilibrated to constant temperature (for at least 20 h) at each of −78° C., −28° C., 10° C., 25° C., 41° C. and 51° C. For the equilibration to −78° C., the temperature was set by storage in dry ice. For the other temperatures, conventional cooling cabinets and drying cabinets were used. For all temperatures below room temperature (25° C.), Liehherr® Comfort cooling cabinets from Liebherr-International Deutschland GmbH were used, whereas, for the storage at and above 25° C., Heraeuse® Thermo Scientific heatable drying cabinets from Heraeus were used. After storage for at least 20 hours at the appropriate temperature, the samples were transferred within 20 seconds to the chamber, at 23° C., of a Snow White SLS printer from Sharebot S.r.l., Italy, and the sintering process was commenced within a further 10 seconds. Test bodies having a diameter of 20 mm were produced with one layer of particles each. The laser power of the $CO_2$ laser used was 6.3 W in the sintering operation, the scan speed was 1.8 m/s and the hatch distance was 0.1 mm. This corresponds to an energy input of 0.035 $J/mm^2$. The sintered test bodies were removed from the crucibles with tweezers and cautiously cleaned with compressed air to remove loosely adhering particles. The test bodies were weighed with a Mettler Toledo MS304S balance and the thickness was determined with a Holex precision caliper gauge. The porosity, the roughness and the tendency to cake and to warp were determined visually in a comparative manner. "No warping" in tables 1 and 2 means that the test body appears planar to the eye, i.e. has no warping in z direction, parallel to the layer surface. Correspondingly, test bodies in table 1 or 2 are given the "warping" label if even slight indications of an increase or warping in z direction were apparent. "No caking" is understood to mean that, after mild cleaning of the test body with compressed air at <2 bar, the geometry of the article corresponds to the predetermined diameter of 20 mm and is not altered by distinctly visible accumulations of adhering particles. "Caking" is correspondingly understood to mean that, after cleaning of the test body, particles still adhered to the test body in a distinctly visible manner at at least one site and do not correspond to the desired predetermined geometry of the test body to be produced. A "continuous layer" under the feature of porosity in tables 1 and 2 means that no significant gaps (diameter about >0.3 mm) are visually apparent in the layer. Table 1 shows the results of the experiments on the materials suitable in accordance with the invention by the method of the invention and the materials that are not suitable in accordance with the invention by the method of the invention. Table 2 shows results for these materials under otherwise identical conditions except that twice the energy input was employed at 0.070 J/mm². It was shown that, even at a material temperature of 50° C., corresponding to a construction space temperature of 50° C., it was not possible to produce usable sintered products from the materials suitable in accordance with the invention. By lowering the material temperature in the sintering process to below 50° C., corresponding to lowering of the construction space temperature to below 50° C., it was possible in the case of the Desmomelt® VPKA8702 material to achieve a sintered layer in target shape for the article to be produced, although the material still has slight caking but no warping.

If the material/construction space temperature is lowered further, for example to 25° C., 10° C., −28° C. and −78° C., it was shown for the materials suitable in accordance with the invention that are labeled (*) in tables 1 and 2 that the results become distinctly better with decreasing temperature. Temperatures below −78° C. are less economically viable for technical purposes; therefore, no lower temperatures were used. It was found that, in the case of inventive materials having a softening point of 20° C. to 100° C., a cooled construction space that enables a low material temperature controlled in the desired manner in the laser sintering process enables distinct advantages in the attainment of the desired dimensional accuracy and density of laser-sintered construction bodies even at the comparatively low laser energies used. By contrast with the inventive polymer powders with a softening temperature of 20° C. to 100° C., in the case of typical SLS polymer powders such as the comparative FS 3300 PA material having a softening temperature of about 183° C., what are obtained at low temperatures are not the desired products but only brittle products that are not well sintered.

TABLE 1

Comparison of the test bodies of materials suitable in accordance with the invention (labeled *) and noninventive materials

| Material temperature (for simulation of a desired construction space/material temperature) [° C.] | Parameter/property | FS 3300 PA | Desmomelt® VPKA8702 (*) | Dispercoll® UXP2682 (*) |
|---|---|---|---|---|
| 51 | Thickness [mm] | 0.25 ± 0.01 | Solidified, shapeless melt | Solidified, shapeless melt |
|  | Weight [g] | 0.016 ± 0.001 |  |  |
|  | Porosity | open pores |  |  |
|  | Warping | no warping |  |  |
|  | Caking | no caking |  |  |
| 41 | Thickness [mm] | 0.25 ± 0.01 | 1.40 ± 0.01 | Solidified, shapeless melt |
|  | Weight [g] | 0.016 ± 0.001 | 0.118 ± 0.001 |  |
|  | Porosity | open pores | continuous layer |  |
|  | Warping | no warping | no warping |  |
|  | Caking | no caking | caking |  |
| 25 | Thickness [mm] | 0.29 ± 0.01 | 0.72 ± 0.01 | 1.63 ± 0.01 |
|  | Weight [g] | 0.013 ± 0.001 | 0.074 ± 0.001 | 0.091 ± 0.001 |
|  | Porosity | hard porous layer | continuous layer | continuous layer |
|  | Warping | no warping | no warping | warping |
|  | Caking | no caking | no caking | caking |
| 10 | Thickness [mm] | 0.18 ± 0.01 | 0.61 ± 0.01 | 0.59 ± 0.01 |
|  | Weight [g] | 0.010 ± 0.001 | 0.067 ± 0.001 | 0.074 ± 0.001 |
|  | Porosity | porous layer | continuous layer | continuous layer |
|  | Warping | no warping | no warping | warping |
|  | Caking | no caking | no caking | caking |
| −28 | Thickness [mm] | Particles remained unsintered | 0.42 ± 0.01 | 0.59 ± 0.01 |
|  | Weight [g] |  | 0.043 ± 0.001 | 0.048 ± 0.001 |
|  | Porosity |  | continuous layer | continuous layer |
|  | Warping |  | no warping | little warping |
|  | Caking |  | no caking | wenig caking |
| −78 | Thickness [mm] | Particles remained unsintered | 0.39 ± 0.01 | 0.38 ± 0.01 |
|  | Weight [g] |  | 0.033 ± 0.001 | 0.039 ± 0.001 |
|  | Porosity |  | continuous layer | continuous layer |
|  | Warping |  | no warping | little warping |
|  | Caking |  | no caking | no caking |

For the lowest temperature of −78° C., one experiment was conducted with particles of the comparative FS 3300 PA material, and one with particles of the Destnomelt® VPKA8702 material suitable in accordance with the invention at twice the energy input. The results are listed in table 2. As is apparent, it was possible here to achieve partial sintering for the noninventive FS 3300 PA material, but no continuous layer was obtained even with this high laser power. A further increase in laser power would lead to partial burning of the material. By contrast, the layer produced with particles of Destriomelt® VPKA8702 has a continuous structure that exhibits neither warping nor caking effects.

TABLE 2

Comparison of the test bodies of materials suitable in accordance with the invention (labeled *) and noninventive materials with twice the energy input

| Material temperature/ corresponds to a desired construction space temperature [° C.] | FS 3300 PA | Desmomelt® VPKA8702 (*) |
| --- | --- | --- |
| −78 | | |
| Thickness [mm] | 0.32 ± 0.01 | 0.48 ± 0.01 |
| Weight [g] | 0.019 ± 0.001 | 0.048 ± 0.001 |
| Porosity | porous layer | continuous layer |
| Warping | no warping | no warping |
| Caking | no caking | no caking |

The invention claimed is:

1. A method of producing an article, comprising the steps of:
    applying a layer of particles to a target surface;
    introducing energy into a selected portion of the layer corresponding to a cross section of the article in a chamber such that the particles in the selected portion are bonded;
    repeating the steps of applying and introducing energy for a multitude of layers, such that the bonded portions of the adjacent layers become bonded in order to form the article;
where at least some of the particles include a fusible polymer;
wherein
the fusible polymer has a melting range (DSC, differential scanning calorimetry, 2nd heating operation at heating rate 5 K/min.) of ≥20° C. to ≤100° C.,
the fusible polymer has a magnitude of the complex viscosity |η*| (determined by viscometry measurement in the melt with a plate/plate oscillation viscometer according to ISO 6721-10 at 100° C. and a shear rate of 1/s) of ≥10 Pas to ≤1 000 000 Pas
and in that the temperature within the chamber is ≤50° C.

2. The method as claimed in claim 1, wherein the introducing of energy into a selected portion of the layer corresponding to a cross section of the article such that the particles in the selected portion are bonded comprises the following step:
    irradiating a selected portion of the layer corresponding to a cross section of the article with a beam of energy in the chamber such that the particles in the selected portion are bonded.

3. The method as claimed in claim 1, wherein the introducing of energy into a selected portion of the layer corresponding to a cross section of the article such that the particles in the selected portion are bonded comprises the following steps:
    applying a liquid to a selected portion of the layer corresponding to a cross section of the article, where said liquid increases the absorption of energy in the regions of the layer with which it comes into contact relative to the regions with which it does not come into contact;
    irradiating the layer in the chamber such that the particles in regions of the layer that come into contact with the liquid are bonded to one another and the particles in regions of the layer that do not come into contact with the liquid are not bonded to one another.

4. The method as claimed in claim 1, wherein the interior of the chamber is cooled at least at times or wherein the interior of the chamber is not heated at least at times.

5. The method as claimed in claim 1, wherein the fusible polymer has a Shore hardness (DIN ISO 7619-1) of ≥40 Shore A to ≤80 Shore D.

6. The method as claimed in claim 1, wherein the fusible polymer is selected from the group consisting of polyurethane, polyester, polyalkylene oxide, plasticized PVC, polyamide, protein or combination of at least two of these.

7. The method as claimed in claim 6, wherein the fusible polymer is a polyurethane obtainable from the reaction of a polyisocyanate component and a polyol component, said polyol component comprising a polyesterpolyol having a no-flow point (ASTM D5985) of ≥25° C.

8. The method as claimed in claim 1, wherein the fusible polymer, after heating to 100° C. and cooling to 20° C. at a cooling rate of 4° C./min, within a temperature interval from 25° C. to 40° C. for ≥1 minute, has a storage modulus G' (determined at the respective temperature with a plate/plate oscillation viscometer according to ISO 6721-10 at a shear rate of 1/s) of ≥100 kPa to ≤1 MPa and, after cooling to 20° C. and storage at 20° C. for 120 minutes, has a storage modulus G' (determined at 20° C. with a plate/plate oscillation viscometer according to ISO 6721-10 at a shear rate of 1/s) of ≥10 MPa.

9. The method as claimed in claim 1, wherein at least some of the particles include the fusible polymer and a further polymer and/or inorganic particles.

10. The method as claimed in claim 1, wherein the article formed is subjected to an aftertreatment selected from the group consisting of: mechanical smoothing of the surface, controlled local heating, heating of the entire article, controlled local cooling, cooling of the entire article, contacting of the article with steam, contacting of the article with the vapor of an organic solvent, irradiating the article with electromagnetic radiation, immersing the article into a liquid bath, or a combination of at least two of these.

11. The method as claimed in claim 1, wherein the particles, after the step of applying a layer of particles to the target surface, are at least partly suspended in a liquid phase.

12. The method as claimed in claim 1, wherein the article is formed on a substrate and, on conclusion of the method, remains bonded to the substrate.

13. An article produced by a method as claimed in claim 1.

14. The article as claimed in claim 13, wherein the article takes the form of a shaped adhesive body.

15. An article produced by a method as claimed in claim 12, having a substrate and an article bonded to the substrate, wherein the article takes the form of an adhesive join or of a varnish region.

* * * * *